US012291442B2

(12) United States Patent
Wigman et al.

(10) Patent No.: US 12,291,442 B2
(45) Date of Patent: May 6, 2025

(54) BEVERAGE DISPENSING ASSEMBLY

(71) Applicant: Heineken Supply Chain B.V., Amsterdam (NL)

(72) Inventors: Peter Henri Samuel Wigman, Amsterdam (NL); Lucas Johannes Cornelis Kouters, Amersfoort (NL)

(73) Assignee: Heineken Supply Chain B.V., Amsterdam (NL)

(*) Notice: Subject to any disclaimer, the term of this patent is extended or adjusted under 35 U.S.C. 154(b) by 25 days.

(21) Appl. No.: 18/027,975

(22) PCT Filed: Oct. 26, 2021

(86) PCT No.: PCT/NL2021/050650
§ 371 (c)(1),
(2) Date: Mar. 23, 2023

(87) PCT Pub. No.: WO2022/093018
PCT Pub. Date: May 5, 2022

(65) Prior Publication Data

US 2023/0331536 A1 Oct. 19, 2023

(30) Foreign Application Priority Data

Oct. 26, 2020 (EP) .................................... 20203953

(51) Int. Cl.
*B67D 1/08* (2006.01)

(52) U.S. Cl.
CPC ......... *B67D 1/0835* (2013.01); *B67D 1/0831* (2013.01); *B67D 1/0839* (2013.01); *B67D 1/0841* (2013.01); *B67D 1/0857* (2013.01)

(58) Field of Classification Search
CPC .. B67D 1/0835; B67D 1/0857; B67D 1/0841; B67D 1/0839; B67D 1/0831
See application file for complete search history.

(56) References Cited

U.S. PATENT DOCUMENTS

2016/0152461 A1* 6/2016 Williams ............. B67D 1/0841 137/320
2020/0087136 A1 3/2020 Ye et al.

FOREIGN PATENT DOCUMENTS

GB 2578883 A 6/2020
WO WO-2007031350 A1 * 3/2007 ........... B67D 1/0834
(Continued)

OTHER PUBLICATIONS

International Search Report & Written Opinion issued in corresponding application No. PCT/NL2021/050650 dated May 6, 2022, 17 pages.

*Primary Examiner* — Marina A Tietjen
(74) *Attorney, Agent, or Firm* — Banner & Witcoff, Ltd.

(57) ABSTRACT

A beverage dispensing assembly comprises a beverage container for containing a beverage, the container body comprising a beverage outlet provided with a beverage container sealing member arranged to enable opening of the beverage outlet. A beverage dispensing line extends between the beverage container and a dispenser for dispensing the beverage at a dispensing outlet of the dispenser. A coupler device is detachable coupled to the container body and coupled to a second beverage conduit of the beverage dispensing line, with a first beverage conduit of the beverage dispensing line extending between the beverage container and the coupler device. The first beverage conduit at a first end thereof comprises an adapter body fittingly arranged on the beverage container covering the beverage container sealing member. A piston is movably arranged in the coupler device for acting on the adapter body that is configured to open the beverage container sealing member upon actuation by the piston causing the beverage container sealing member
(Continued)

to open the beverage outlet to provide a fluid connection between the beverage chamber and the first beverage conduit.

23 Claims, 13 Drawing Sheets

(56) References Cited

FOREIGN PATENT DOCUMENTS

| | | | | |
|---|---|---|---|---|
| WO | 2007148360 | A1 | 12/2007 | |
| WO | 2008147200 | A2 | 12/2008 | |
| WO | WO-2009036759 | A3 * | 8/2009 | ............... B67D 1/07 |
| WO | 2013006655 | A1 | 1/2013 | |
| WO | 2021107781 | A1 | 6/2021 | |

* cited by examiner

BEVERAGE DISPENSING ASSEMBLY

FIELD OF THE INVENTION

The invention relates to a beverage dispensing assembly. The invention further relates to a coupler device for use in a beverage dispensing assembly. The invention also relates to a beverage conduit for use in a beverage dispensing assembly.

BACKGROUND

There is a wide variety of beverage dispensing assemblies available for dispensing all sorts of beverages. A common beverage dispensing assembly that is often used for dispensing beverages in food and beverage service establishments and hospitality industry, such as bars and restaurants, comprises a beverage container containing a beverage and a beverage dispensing line extending between the beverage container and a dispenser, such as a faucet with tap handle, for dispensing the beverage at a dispensing outlet of the dispenser, with a coupler device arranged for coupling the beverage dispensing line to the beverage container, wherein a piston in the coupler device is movably arranged for causing a beverage container sealing member to open to provide a fluid connection between the beverage container and the beverage dispensing line. As such with the known beverage dispensing assembly a beverage can be dispensed by first actuating the piston in the coupler device to cause the beverage container sealing member to open, so called broaching of the beverage container. After broaching beverage contained in the beverage container may freely flow past the opened sealing member through the coupler device into the beverage dispensing line up to a dispensing valve, which is usually provided in the dispenser. The dispenser may be operated as desired to open and close the dispensing valve, wherein when the dispensing valve is opened an amount of beverage can flow from the beverage container through the coupler device and dispensing line to a dispensing opening of the dispenser for dispensing the beverage in a suitable receptacle such as a drinking glass or cup.

During its lifetime in use, the dispensing assembly is exposed to microorganisms present in the environment of the dispensing assembly. These microorganisms pose a risk of infiltrating particularly the dispensing line, for example during an exchange of beverage containers. Upon following coupling of the coupler device to a new beverage container holding a fresh amount of beverage such microorganisms may migrate from the dispensing line into the beverage kept in the beverage container which forms a suitable and sufficient source of nutrients for the microorganisms to expand rapidly by multiplication. As a result a shelf life of such beverage contained in the beverage container, i.e. period in which the beverage in the container may normally be suitably consumed, may decrease and/or the beverage may prematurely become spoiled otherwise. Furthermore, if the beverage has a low alcohol by volume percentage, or is completely alcohol free, and/or has a relatively high sugar content, such as some alcohol free beers, the beverage is particularly susceptive for contamination by fermenting microorganisms such as wild yeast which may lead to unwanted increase of alcohol contents in the beverage due to fermentation.

It is an object of the invention to provide a beverage dispensing assembly which slows down spoiling of the beverage. In particular, it is an object of the invention to prevent microorganism contamination of the beverage contained in the beverage container of such beverage dispensing assembly. Specifically it is an object of the invention to prevent backflow of fluid and microorganisms from the beverage dispensing line into the beverage container of such beverage dispensing assembly. More particular, it is an object of the invention to provide a beverage dispensing assembly that prevents an alcohol formation in the beverage contained in the beverage container without need of cooling the beverage container. The invention has as another object to provide a coupler device for use in such a beverage dispensing assembly. Furthermore the inventions has the object to provide a suitable beverage conduit for use in such a beverage dispensing assembly. More particularly, it is an object of the invention to provide a beverage conduit for use in such a beverage dispensing assembly that prevents an alcohol formation in a beverage container of the beverage dispensing assembly without need of cooling the beverage container.

DESCRIPTION OF THE INVENTION

Accordingly, in a first aspect of the invention there is provided a beverage dispensing assembly comprising a beverage container with a container body defining a beverage chamber for containing a beverage, for example an alcohol free beverage such as alcohol free beer, the container body comprising a beverage outlet provided with a beverage container sealing member arranged to enable opening of the beverage outlet, a beverage dispensing line extending between the beverage container and a dispenser, such as a faucet with tap handle, for dispensing the beverage at a dispensing outlet of the dispenser, and a coupler device comprising a coupler housing arranged for detachable coupling to the container body and for coupling the beverage dispensing line, the coupler housing defining a piston space in which a piston is movably arranged for causing the beverage container sealing member to open the beverage outlet to provide a fluid connection between the beverage chamber and the beverage dispensing line, wherein the beverage dispensing line comprises a first beverage conduit and a second beverage conduit separate from the first beverage conduit; the first beverage conduit with a first end thereof connected to the beverage container in fluid communication with the beverage outlet and a second end thereof connected to the coupler device to form at least part of a first beverage flow path arranged to guide flow of beverage from the beverage chamber to the coupler device when the beverage outlet is open, the second beverage conduit connected to the coupler device to form a second beverage flow path arranged to guide flow of beverage from the coupler device to the dispenser, and wherein the first beverage conduit at the first end thereof comprises an adapter body through which the first beverage flow path extends, the adapter body being fittingly arranged on the beverage container covering the beverage container sealing member, which adapter body is configured to open the beverage container sealing member upon movement of the piston of the coupler device acting on the adapter body.

The beverage dispensing assembly in this first aspect prevents direct fluid exchange between the beverage container and coupler device upon opening of the beverage container sealing member, i.e. fluid and possible contamination first has to travel the distance through the first beverage conduit extending between the beverage container and coupler device. This particularly provides an increased distance for microorganisms to travel from the coupler device, which usually is the main 'hot spot' for microorganism infiltration in the dispensing line, to the beverage kept in the beverage chamber. The piston of the coupler device used to broach the beverage container does not pose a possible contamination source for the beverage contained in the beverage container as the adapter body of the first beverage conduit forms an effective fluid barrier between the piston and the beverage outlet of the beverage container. As such an almost immediate contamination of the beverage in the beverage chamber upon coupling to an infiltrated dispensing line, is prevented.

The beverage container sealing member may comprise any suitable means for fluid tight sealing off the beverage chamber prior to use. For example the beverage container sealing member may be a fluid tight cover or seal that allows opening of the beverage outlet by piercing of the cover or seal or removal of at least part of the cover or seal by the adapter body upon movement of the piston of the coupler device acting on the adapter body. In a preferred aspect however the beverage dispensing assembly has the beverage container sealing member comprising a beverage valve arranged in the beverage outlet opening and movable between a closed position in which the beverage chamber is closed off and an open position in which the beverage chamber is open for beverage dispensing. For example the beverage valve may comprise a pivotable and/or translatable valve body, e.g. a thin metal plate, that can be moved from the closed position into the open position by the piston acting thereon, such as the piston with an outer end thereof pushing on the valve body. Optionally, the beverage valve may be arranged to return from the open position into the closed position. For example the beverage valve may be provided with a spring that biases the beverage valve in the closed position.

The first beverage conduit is particularly arranged such that a shelf life of beverage contained in the beverage container remains at least mostly unaffected and the beverage does not become prematurely spoiled otherwise without need of cooling the beverage container. Preferably the first beverage conduit is arranged such as to completely prevent microorganisms from migrating into the beverage chamber.

The first beverage conduit may be arranged such to, in use, form at least part of a first beverage flow path extending in a horizontal or downward flow direction from the beverage chamber to the coupler device. Such beverage flow path in the dispensing line extending horizontally or downwards in a flow direction from the container to the coupler device, is effective in reducing a migration rate of microorganisms as migration through the beverage flow path in the opposite direction, i.e. horizontally or upwards, is thereby rendered fully dependent on expansion by multiplication of the microorganisms as gravity assisted movement of the microorganisms into the beverage chamber is prevented. The flow channel thus acts as a barrier means for microorganisms migrating from downstream of the flow first beverage conduit in a direction upstream of the first beverage conduit towards the beverage chamber. Microorganisms particularly need to migrate in a horizontal or an upward direction against gravity through the length of the first beverage conduit in order to reach the container. In use, the beverage dispensing assembly provides sufficient retardation or reduction of contamination of the beverage in the beverage chamber to allow consumption of the total beverage amount at an average consumption rate before spoil of the beverage occurs when containing microorganisms in the coupler device, i.e. premature spoilage of beverage due to microorganism contamination is prevented. Typically in beverage dispensing assemblies, the beverage container is provided below the dispenser. For example, the beverage container may be provided underneath a counter of a bar, wherein the dispenser is provided above the counter. In such case, the flow path in the dispensing line extends upwardly with respect to the flow direction from the container towards the dispenser. By instead providing a downwardly extending flow path in the first beverage conduit, upstream of the coupler device, microorganisms that may have infiltrated the coupler device and/or second beverage conduit of the dispensing line will settle at a low region, e.g. a local minimum, of the dispensing line a distance away from the beverage chamber of the beverage container. The horizontal or downward extending flow path may be provided over a full length of the first beverage conduit or may be a part thereof with other parts of the first beverage conduit extending in another direction, e.g. in an upward flow direction from the beverage chamber to the coupling means.

In an embodiment of a beverage container suitable for use in the beverage dispensing assembly of the first aspect herein the first beverage conduit is sealingly attached to the container body such that entry of microorganisms into the beverage chamber through an attachment interface between the container body and first beverage conduit is prevented. For example, the first beverage conduit may be integral with the container body or at least a part thereof. Optionally, the first beverage conduit may be pre-assembled together with the beverage container, e.g. with the adapter body sealingly fixed in the beverage container outlet. Direct infiltration of the beverage chamber through the container body and first beverage conduit by microorganisms is thereby prevented while the first beverage conduit acts to counter microorganism migration into the beverage chamber upon coupling of the beverage container to the coupler device.

In an aspect of the beverage dispensing assembly the adapter body comprises an annular flange sealingly arranged in the beverage outlet of the beverage container, the adapter body comprising a protruding member extending axially from the annular flange and arranged to displace in an axial direction upon movement of the piston of the coupler device to a position acting on the adapter body to engage the sealing member for opening and closing of the beverage chamber. As such the adapter body interposes between the beverage chamber beverage outlet and the piston of the coupler device, preventing any direct contact between the coupler device and beverage flowing out of the beverage outlet.

The first beverage conduit may conveniently comprise a tube defining the beverage flow path, which tube is attached on one end to the container body by means of the adapter body and an opposite end of the tube being provided with coupling means for coupling to the coupler device. The first beverage conduit or at least the tube may be a body separate from the container body, for example be designed as a disposable body. Being disposable may imply that the first beverage conduit or the tube is relatively cheap and/or easy to manufacture and may be disposed of, e.g. discarded, after use thereof. As such, the first beverage conduit or the tube may be made entirely out of polymers suitable for beverage dispensing assemblies, for example silicone. Thus, the first beverage conduit may comprise a plastic tube or be made out of a plastic tube. The first beverage conduit may optionally be recyclable or made of recyclable material. The first beverage conduit may at the opposite end comprise coupling means for coupling to the coupler device. For example the coupling means may comprise a snap-fit connector for coupling to corresponding snap-fit means of the coupler device. Optionally the opposite end of the first beverage conduit may be provided with a fluid seal, for example a peel seal or removable cover, that prior to use fluid tightly seals an open end of the first beverage flow path. Upon use, i.e. when connecting the first beverage conduit to the coupler device, the fluid seal may be opened or removed to allow flow of beverage from the first beverage flow path to the coupler device.

Optionally, a coupling interface provided between the first beverage conduit and the container body differs from a coupling interface between the second beverage conduit and the coupler device such that direct coupling of the second beverage conduit of the dispensing line to the container body without the first beverage conduit and coupler device is not possible.

Preferably the beverage dispensing assembly is provided by coupling of the beverage container, comprising the first beverage conduit attached to the container body, to the coupler device connected to the second beverage conduit. The first beverage conduit and the container body may be preassembled to form the beverage container. The first beverage conduit and the container body may be sterilized after preassembling thereof and/or are, preferably, preassembled in a sterile environment. Preferably the first beverage conduit and the container body are maintained sterile, i.e. closed off from the environment, until coupling thereof to the coupler device and dispenser to form the beverage dispensing assembly. For example the free coupling ends of the first beverage conduit may be closed prior to coupling, e.g. by means of a seal. The seals on the respective ends of the first beverage conduit may be openable or removable at least in part so as to allow a flow of beverage through the first beverage flow path after coupling of the first beverage conduit between the beverage container and the coupler device. Each seal may for example comprise a foil attached at and spanning over the respective free coupling end of the first beverage conduit. The foil may for example be perforated upon coupling to the beverage container or coupler device or may be manually peeled off the coupling end of the first beverage conduit prior to coupling to the beverage container or coupler device, to open the first beverage flow path through the first beverage conduit.

The second beverage conduit may for example be formed by a normal beer tube that is connected to a dispenser, such as a faucet, comprising the dispensing opening. The second beverage conduit may be removably connected to the dispenser. The second beverage conduit and the dispenser may be preassembled.

The beverage dispensing assembly in accordance with the foregoing allows coupling and uncoupling, i.e. exchange, of beverage containers to an existing dispenser on site, such as in a bar, with a reduced risk of microorganisms which may be present in the coupler device, second beverage conduit or the dispenser, or which may enter the coupler device, second beverage conduit or the dispenser during coupling, from migrating into the beverage chamber of the coupled beverage container.

Optionally, the first beverage flow path comprises a bend extending downwards in a flow direction from the beverage chamber to the coupler device. Along the bend, the dispensing line could vary in steepness for creating a suitable migration barrier for microorganisms.

Optionally the bend defines an almost 360° turn in the first beverage flow path, and preferably is provided as a looping in the first beverage conduit. The 360° turn creates a suitable barrier for microorganisms to reduce migration into the beverage container. Particularly, in the almost 360 degrees turn, the dispensing line defines a vertically oriented flow path section and an overhanging flow path section which are particularly difficult for microorganisms to migrate across.

Optionally the first beverage conduit comprises a plurality of loops consecutively provided along the first beverage flow path. A majority of microorganisms in the dispensing line will settle at a low region, e.g. a lowest part of the first 360 degrees turn relative to the coupling means. In the event that some microorganisms do migrate past said first 360 degrees turn the consecutive 360 degrees turns effectively prevent such microorganisms from migrating into the beverage chamber of the beverage container.

Optionally, the loops or loopings define a spiraling section of the flow path. In the spiraling section the loops or loopings may be provided with a same loop diameter, i.e. two or more loops of the plurality of loops have the same size, or with a varying loop diameter, i.e. two or more loops of the plurality of loops have different sizes. In the spiraling section the loops or loopings may be provided in the same plane or may be provided in three dimensions, i.e. form a helical section or helix. Optionally, the spiralling section of the flow path defines a helical section of the flow path. The spiraling section is effective in preventing migration of microorganisms there through while requiring minimal space between the beverage container and the coupling means. A central axis of the spiraling section or helical section, i.e. the axis around which the loops or loopings revolve, may extend in any direction with respect to a direction of the flow path downstream of the first 360 degrees turn relative to the coupling means. Optionally the central axis of the spiraling section or helical section extends in the same direction, i.e. in line, as the flow path downstream of the first 360 degrees turn relative to the coupling means. The central axis of the spiraling section or helical section may instead also extend under an angle, i.e. not in line, to the flow path downstream of the first 360 degrees turn relative to the coupling means, for example transverse to the flow path downstream of the first 360 degrees turn relative to the coupling means.

Optionally, the first beverage conduit of the dispensing line comprises a flexible tube or other flexible liquid conduit. Flexibility of the tube or other liquid conduit allows for easy arrangement of the upstream flow path to comprise a beverage flow channel extending in a horizontal or downward flow direction from the beverage chamber to the coupling means, for instance by bending the flexible tube or other liquid conduit. The tube or other liquid conduit may be provided in a length suitable to sufficiently reduce a microorganism migration rate from the downstream part there through into the beverage chamber such that premature spoilage of beverage due to microorganism contamination is prevented. A suitable length may depend on a total volume of beverage to be consumed and kept in the beverage container. Preferably the length of the tube or other liquid conduit is at least 5 cm. A length of the tube or other liquid conduit is preferably sufficient to provide a loop in the tube or other liquid conduit and more preferably sufficient to provide multiple loops or a spiralling section in the tube or other liquid conduit. The length of the tube or other liquid conduit may for example be at least 30 cm. For convenience in storage, transport, and handling a length of the tube or other liquid conduit is preferably not excessively long. For instance when the tube or other liquid conduit is preassembled with the container body, the length preferably does not exceed 1-2 meter, although longer lengths may be used if needed or desired for any reason. A length of the tube or liquid conduit may determine the length of the first beverage flow path and/or beverage flow channel. That is, a length of the flexible tube or flexible other liquid conduit provided with a bend or loop or multiple loops may, in a straight form of such tube or liquid conduit, be identical to a length of the first beverage flow path and/or beverage flow channel defined therein. Thus the tube or other liquid conduit may for example be provided with a spiralling section and have a length of approximately 100 cm, whereas a distance between the container body on one end of the tube or other liquid conduit and the coupling end of the second part of the dispensing line on the opposite end of the tube or other liquid conduit is merely several centimetres.

Optionally, the first beverage flow path comprises a yeast trap. The yeast trap provides a further barrier in the first beverage flow path particularly against yeast for migrating into the beverage chamber. The yeast trap may for example in addition to a main beverage flow channel through which beverage may flow from the beverage chamber to the dispenser comprise one or more spaces, e.g. chambers or side channels, branching of the main beverage flow channel in a direction of migration of the microorganisms towards the beverage chamber, the one or more spaces adapted to capture microorganisms while not hindering a fluid flow through the main beverage flow channel from the beverage chamber to the dispenser. For example the first beverage flow path in the first beverage conduit may fork one or multiple times in a height direction with an upper fork path continuing as part of the main beverage flow channel and a lower fork path adapted, e.g. by having a dead end, to capture yeast cells, which under gravity will sediment in the lower fork path, and thus be inhibited from further migrating through the upper fork path toward the beverage chamber.

Optionally the yeast trap may comprise means for actively separating yeast from the fluid, such as centrifugal means. For example the centrifugal means may comprise magnetic means, such as a magnetic element, provided and arranged to cause whirling of the fluid in the first beverage flow path such that the yeast is actively forced outward by centrifugal forces. Alternatively or additionally yeast capture spaces may be provided in the first beverage conduit along the first beverage flow path to trap yeast from moving further in an upstream direction. For example the first dispensing ling part may comprise a body such as a tube having a central fluid lumen defining the beverage flow channel in the first beverage flow path through which in use pressurized fluid may flow under influence of centrifugal forces, with the body of the first dispensing line comprising one or more yeast capture chambers provided along a length of the central fluid lumen, wherein the one or more yeast capture chamber is/are arranged such that in use a direction of flow of pressurized fluid is through the central fluid lumen past the chamber(s), i.e. there is no pressurized fluid flow in the chamber(s), while enabling by means of centrifugal forces the capture of yeast in the chamber(s).

In another aspect of the beverage dispensing assembly the adapter body comprises a gas flow channel extending through the annular flange from a gas inlet opening on a first face of the adapter body facing the piston of the coupler device to a gas outlet opening on a second face of the adapter body facing the beverage chamber. As such gas may be fed to the beverage chamber for pressurizing the beverage contained in the beverage container.

Another aspect of the beverage dispensing assembly has the coupler device comprising a gas flow path from a gas conduit inlet opening arranged to couple a gas conduit to the coupler device to a gas outlet opening in fluid communication with the gas inlet opening of the adapter body for supplying gas to the beverage container.

In another aspect of the beverage dispensing assembly the gas flow path extends from the inlet opening through the movable piston to the gas outlet.

In a preferred embodiment of a beverage dispensing assembly according to the first aspect herein, cooling means are provided and arranged for cooling at least part of the first beverage conduit such that microorganisms are prevented from migrating through an amount of beverage residing in the first beverage flow path to enter the beverage container. Additional cooling of the first beverage flow path inhibits growth and reproduction of the occasional microorganisms that may have advanced into said flow path to prevent that those microorganisms expand by multiplication and reach the beverage container.

Optionally, the cooling means comprises one or more cooling systems selected from the group consisting of liquid cooling systems, air cooling systems, and evaporative cooling systems. Such cooling means may be arranged to specifically cool the first beverage flow path of the beverage dispensing assembly. Cooling of other parts of the beverage dispensing assembly is optional. Cooling of just the first beverage flow path allows the cooling means to be relatively simple and compact for cooling only that part of the dispensing line.

Optionally cooling liquid means, e.g. a coolant circuit through which cooling liquid flows, may be provided in a heat exchange region together with the first beverage flow path of the first beverage conduit to cool the first beverage flow path by heat exchange. For example, the first beverage conduit of the dispensing line may be arranged with multiple loops or as a spiralling section, within the inner cooling chamber of cooling means in heat exchange contact with a cooling liquid circuit.

In another aspect the beverage dispensing assembly has the coupler device comprising inside the coupler housing a cooling body arranged to thermally connect with the first beverage conduit to cool at least part of the first beverage conduit when the first beverage conduit is coupled to the coupler device.

In another aspect of the beverage dispensing assembly the cooling body comprises a cooling plate with a cooling surface adjacent to the at least part of the first beverage conduit.

In another aspect the beverage dispensing assembly the at least part of the first beverage conduit is provided with a conduit spiral section spiraling in a plane adjacent to the cooling plate cooling surface for cooling at least the conduit spiral section.

In another aspect the beverage dispensing assembly has the cooling plate substantially made of a metal or other material with thermal conductivity properties similar to metal, the cooling plate preferably substantially made of nickel-plated brass.

In another aspect the beverage dispensing assembly further comprising a coolant circuit for circulating a coolant fluid from a coolant fluid source along the cooling body for cooling the cooling body.

Another aspect of the beverage dispensing assembly has the coolant circuit including a coolant chamber inside the coupler housing adjacent the cooling body, which coolant chamber is in fluid communication with a coolant supply channel of the coolant circuit coupled with one end to the coolant fluid source and with an opposite end coupled to the coupler device for supplying the coolant to the coolant chamber.

Another aspect of the beverage dispensing assembly has the coupler device contains a coolant drain channel for draining the coolant from the coolant chamber to a coolant return channel of the of the coolant circuit.

In another aspect of the beverage dispensing assembly the coolant return channel is coupled with one end to the coupler device and with an opposite end to the coolant fluid source, and wherein at least one of the coolant supply channel and coolant return channel extends at least partly coaxially with the second beverage conduit for cooling a beverage flow through the second beverage conduit.

Optionally, the cooling means are arranged to cool the at least part of the first beverage conduit of the dispensing line to a temperature of 6° C. or lower. Below 6° C. metabolism of the microorganisms lowers which reduces growth and reproduction rates of the microorganisms. Migration of microorganisms through the first beverage flow path is effectively halted at temperatures of 4° C. or lower. Preferably the first beverage flow path of the dispensing line is cooled to between 0° C.-3° C. to prevent freezing of beverage resident in the flow path.

Optionally, the beverage container contains a beverage having an alcohol by volume percentage of 2% or less, preferably 1.2% or less, and more preferably 0.5% or less. Contamination prevention is particularly important for beverages with low alcohol contents, as these form particularly suitable growth environments for microorganisms, such as yeasts. Moreover, yeasts and/or other microorganisms may convert sugars present in the beverage which may adversely affect the taste of the beverage and yeasts may particularly convert the sugars into alcohol by fermentation, disadvantageously increasing the alcohol content thereof.

Optionally, the beverage is essentially free of alcohol.

Optionally, the beverage is an alcohol-free malt beverage, for example, alcohol-free beer, or an alcohol-free fermented fruit beverage, for example, alcohol-free cider.

Another aspect of the beverage dispensing assembly has the coupler device comprising a securing mechanism for securing a connection between the coupler device and the first end of the first beverage conduit.

A particular aspect of the beverage dispensing assembly has the coupler device comprising a broach lever coupled to the movable piston for actuating the movable piston to move in the piston space between an unbroached position in which the piston does not act on the adapter body and a broached position in which the piston acts on the adapter body to open the beverage container sealing member, wherein the coupler device comprises a first blocking mechanism arranged for preventing the broach lever from actuating the piston.

A further aspect of the beverage dispensing assembly has the first blocking mechanism comprises a first blocking body arranged to move between a blocking state to block a movement of the movable piston from the unbroached position to the broached position, and an unblocking state in which movement of the movable piston from the unbroached position to the broached position is possible through actuation by the broach lever.

the securing mechanism includes a securing state in which the connection between the coupler device and the first end of the first beverage conduit is secured, and an unsecured state in which the connection between the coupler device and the first end of the first beverage conduit is unsecured, wherein the securing mechanism is operatively coupled to the first blocking mechanism in such a way that the first blocking mechanism is brought into the unblocking state upon bringing the securing mechanism in the secured state, and the first blocking mechanism is brought into the blocking state upon bringing the securing mechanism in the unsecured state.

Another aspect of the beverage dispensing assembly has the securing mechanism comprises a detector mechanism for detecting the presence of a connection between the coupler device and the first end of the first beverage conduit, wherein the detector mechanism is configured to cooperate with the securing mechanism in such a way that the detector mechanism enables the securing mechanism to be brought in the secured state in case the detector mechanism detects the presence of said connection, and to cooperate with the securing mechanism in such a way that the detector mechanism precludes the securing mechanism to be brought in the secured state in case the detector mechanism detects an absence of said connection.

In a further aspect the beverage dispensing assembly has the first end of the first beverage conduit comprises a connecting body arranged to connect the first beverage conduit to the coupler device, the connecting body comprising a detection member arranged to be detected by the detector mechanism when the first end of the first beverage conduit is connected to the coupler device to bring the securing mechanism in the secured state.

Another aspect of the beverage dispensing assembly has the securing mechanism comprises a movable securing body, preferably a pivoting door, coupled to the coupler housing, the movable securing body in a closed state enclosing a space defined between the movable cover body and the coupler housing and in an open state providing access to the space, wherein the first end of the first beverage conduit is arranged to fit in the space when connected to the coupler device.

In another aspect the beverage dispensing assembly has the coupler device comprises a valve, preferably a ball valve, between the first beverage flow path and second beverage flow path, the valve being operable by means of a valve operating device to move the valve between an open position in which the valve opens fluid communication between the first beverage flow path and second beverage flow path, and a closed position in which the valve stops fluid communication between the first beverage flow path and second beverage flow path.

A further aspect of the beverage dispensing assembly has the coupler device comprising a second blocking mechanism for blocking the actuation of the movable piston from the broached position to the unbroached position in case the valve is in the open state.

Another aspect of the beverage dispensing assembly has the second blocking mechanism is movable between a blocking state in which the second blocking mechanism blocks the actuation of the piston and an unblocking state in which the second blocking mechanism unblocks the actuation of the piston to enable movement of the piston from the broached position to the unbroached position through actuation by the broach lever, the second blocking mechanism being movable from the blocking state to the unblocking state by moving the valve from the open position to the closed position, and the second blocking mechanism being movable from the unblocking state to the blocking state by moving the valve from the closed position to the open position.

In a further aspect the beverage dispensing assembly has the coupler device comprising a third blocking mechanism arranged for blocking the operation of the valve from the closed position to the open position, in case the broach piston is in the broached position.

In another aspect the beverage dispensing assembly has the first blocking body comprises a shaped through-hole configured to align with a cross sectional shape of part of the movable piston in the unblocking state of the first blocking body to allow said part of the movable piston to extent in the through-hole and to physically block the movable piston from moving when the first blocking body is in the blocking state.

A further aspect of the beverage dispensing assembly has the second blocking mechanism comprises a second blocking body arranged for engaging the piston in the blocking state of the second blocking mechanism, to block a movement of the piston from the broached position to the unbroached position, the second blocking body comprising a second shaped through-hole configured to align with a cross sectional shape of part of the movable piston in the unblocking state of the second blocking body to allow said part of the movable piston to extent in the second through-hole and to physically block the movable piston from moving when the second blocking body is in the blocking state.

In a particular aspect the beverage dispensing assembly has the piston comprises a shoulder configured for cooperating with the first blocking organ and/or the second blocking organ.

According to a second aspect of the invention a coupler device for use in a beverage dispensing assembly in accordance with the first aspect described herein is provided.

In a third aspect of the invention a conduit for use as a first beverage conduit in a beverage dispensing assembly in accordance with the first aspect described herein is provided, wherein the beverage conduit defines a first beverage flow path and comprises a first end for coupling to a beverage container and an opposite second end for coupling to a coupler device of the beverage dispensing assembly, wherein the first end comprises an adapter body through which the first beverage flow path extends, the adapter body configured to fit in a beverage outlet of a beverage container of the beverage dispensing assembly to cover a beverage container sealing member, wherein the second end of the beverage conduit comprises a conduit spiral section spiraling in a plane within a conduit connecting body for connecting to the coupler device.

In another aspect the conduit has the first end and second end prior to use in a beverage assembly are sealed with a manually removable seal.

Another aspect of the conduit has the beverage conduit comprising a flexible plastic beverage tube extending between the adapter body and the connecting body.

BRIEF DESCRIPTION OF THE DRAWINGS

These and other aspects of the present invention are hereinafter further elucidated by the appended drawing and the corresponding embodiment, which form part of the present application. The drawing is not in any way meant to reflect a limitation of the scope of the invention, unless this is clearly and explicitly indicated. In the drawing.

In this application similar or corresponding features are denoted by similar or corresponding reference signs. The description of the embodiment is not limited to the examples shown in the figures and the reference numbers used in the detailed description and the claims are not intended to limit the description of the embodiments, but are included to elucidate the embodiment by referring to the examples shown in the figures.

DETAILED DESCRIPTION

Figure 1:
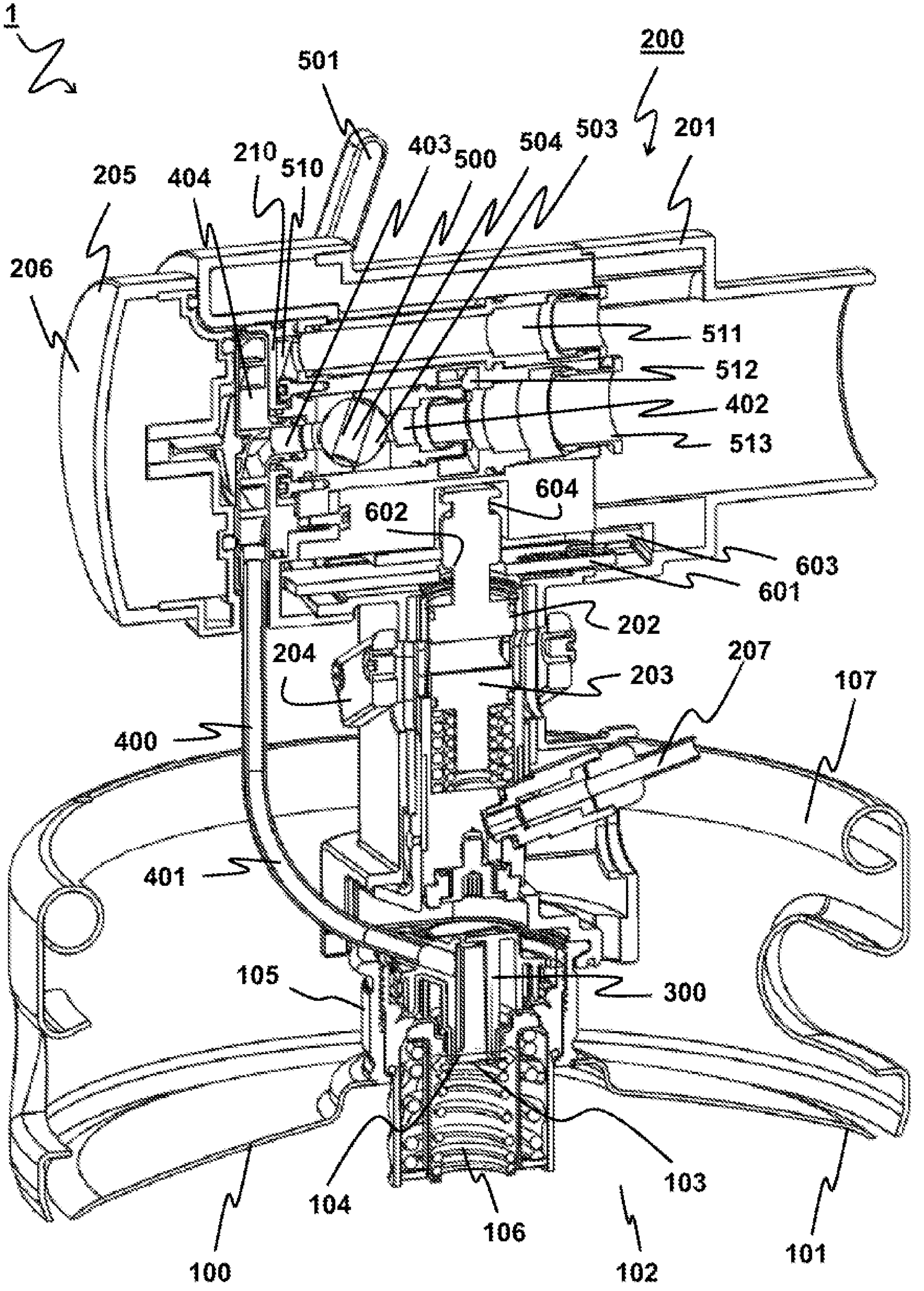
FIGS. 1, 2, 4, 5 and 6 show a cross-sectional view of respective states of a beverage dispensing assembly.
Figure 2:
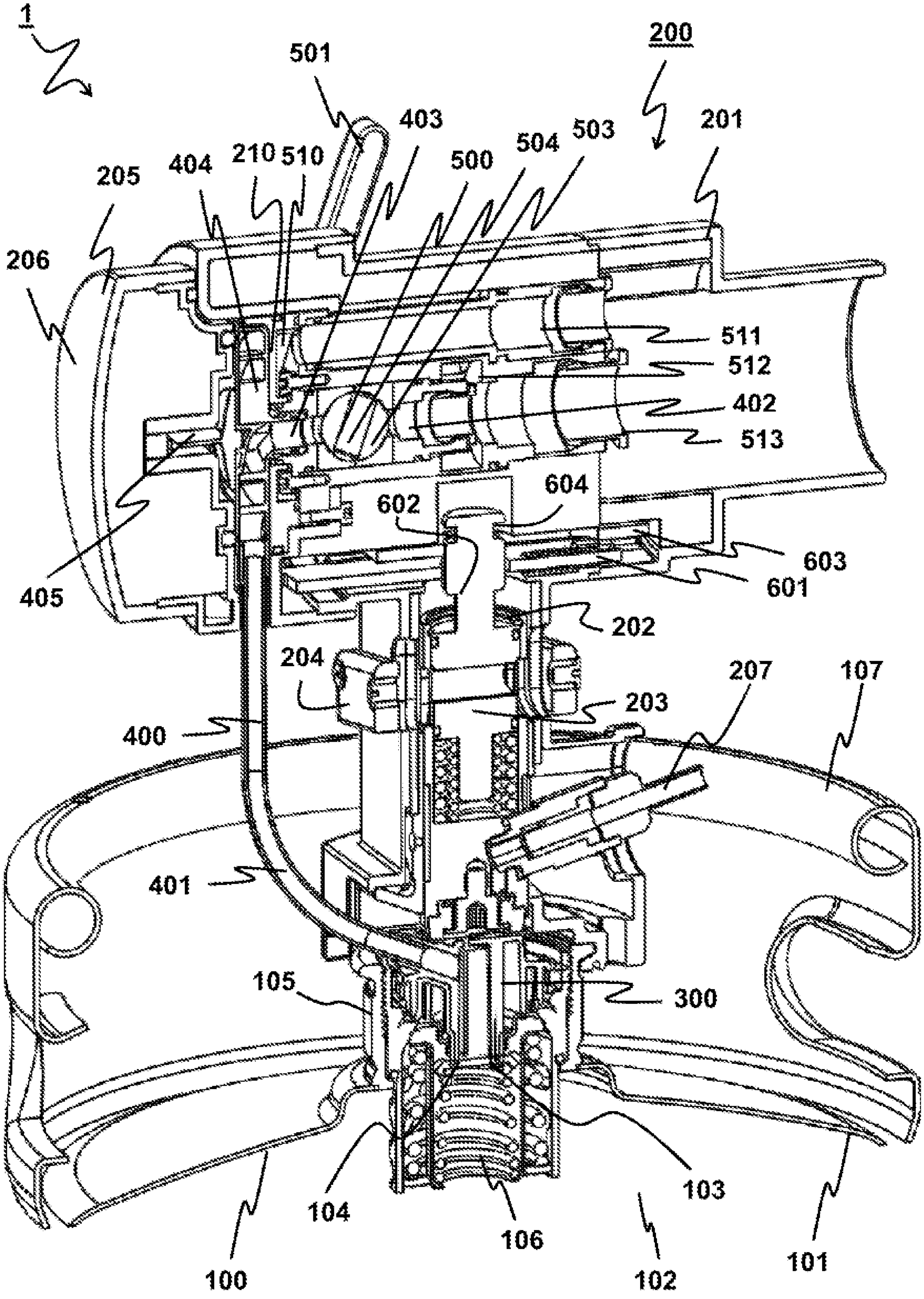

The figures show a cross-sectional view of a beverage dispensing assembly 1. The assembly 1 comprises a beverage container for containing a beverage, for example a conventional metal keg for containing a beverage such as beer, of which an upper part 100 is shown in FIGS. 1-2. The upper part 100 of the keg comprises a top wall 101 delimiting a beverage chamber of the beverage container at an upper side. The top wall 101 of the keg comprises a neck portion 105 defining a beverage outlet 103 in which a beverage container sealing member 104, here a valve, is provided for opening and closing of the beverage chamber. The valve is spring loaded in a closed position by means of a spring 106. The upper part 100 of the keg further comprises a carrying skirt 107 extending upwards from a periphery of the top wall 101 to allow easy carrying of the keg.

The beverage dispensing assembly 1 further comprises a coupler device 200 with a coupler housing 201 which is releasably coupled to the neck portion 105 of the beverage container. The coupler housing 201 defines a piston space 202 in which a piston 203 is movably arranged. The coupler device 200 may typically be used in a bar or other type of beverage dispensing establishment where beverage dispensing assemblies are used, where the coupler device 200 is used to conveniently and safely connect a beverage container to a faucet or other type of dispenser at the bar. The coupler device 200 can be easily released from the neck portion 105 of the beverage container to allow an exchange of such beverage container with another beverage container, for example to replace an emptied beverage container for a new beverage container carrying a fresh amount of beverage.

The beverage container prior to use is typically sealed by means of the sealing member 104 to conserve the beverage in the beverage chamber. Opening of the beverage container provides a risk of contaminating the beverage contained in the beverage chamber, as microorganisms may enter the beverage chamber through the opened beverage outlet 103. To limit occurrence of contamination of the beverage contained in the beverage container, the beverage dispensing assembly 1 further comprises an adapter body 300 arranged for cooperating with the beverage container sealing member 104. The adapter body 300 is preferably associated with the beverage container 100, i.e. each beverage container 100 is provided with its own adapter body. The adapter body 300 forms one end of a first beverage conduit 401 of a beverage line 400 of the beverage dispensing assembly, which first beverage conduit 401 comprises a flexible tube extending from the beverage chamber 102 to the coupler device 200. The adapter body 300 is configured to fluidly connect the beverage chamber 102 with the flexible tube when the beverage container sealing member 104 is open. The adapter body 300 comprises an annular sealing flange 302 with which the adapter body 300 is sealingly coupled in the beverage outlet 103 of the beverage container. Extending axially with respect to the annular flange 302 is a protruding member 301 of the adaptor body 300 which is arranged to engage the sealing member 104 for opening and closing of the beverage chamber.

Provided in the coupler housing 201 is a piston 203 which is movably arranged in a piston space 203 that is formed by the coupler housing 201. The piston 203 can be actuated by a user, by means of a broach lever 204. The piston 203 of the coupler device 200 is arranged to engage the adapter body 300 to provide the fluid connection between the beverage chamber 102 and the first dispensing line 401. In this example, the piston 203 is vertically movable in the piston space 202 relative to the coupler housing 201, wherein a downward movement of the piston 203 pushes down on the adapter body 300 which in turn pushes with the protruding member on the valve 104 to move the valve 104 from its closed position in the beverage outlet 103 to the open position, compressing the spring 106, thereby providing a passage for the beverage contained by the beverage container 100 to flow out of the outlet 103 and into the first beverage conduit 401.

In the coupler housing 201 a passage for a propellant gas, e.g. carbon dioxide gas, is provided so as to allow the propellant gas from an external gas source to flow into the beverage chamber 102 to pressurize the beverage contained in the beverage container. Hereto, the coupler device 200 comprises a gas flow path from a gas conduit inlet opening 207, for connecting thereto a gas conduit extending from an external gas source, to a gas outlet opening. The gas flow path extends from the inlet opening 207 through the movable piston 203 to the gas outlet opening. The adapter body 300 comprises a gas flow channel extending through the annular sealing flange 302 from a gas inlet opening 310 on a first face of the adapter body facing the gas outlet opening in the piston of the coupler device to a gas outlet opening on a second face of the adapter body facing the beverage chamber.

The coupler device 200, being at one end of the coupler housing 201 coupled to the beverage container, is coupled at another end of the coupler housing 201 to a second beverage conduit 402 of the beverage line 400. The second beverage conduit 402 for example comprises a flexible beverage tube extending between the coupler housing 201 and a faucet for dispensing the beverage into a beverage receptacle.

The coupler device 200 is further arranged to be coupled to a coupling member 403 of the first beverage conduit 401. The coupling member 403 is provided at a second end of the first beverage conduit 401, opposite the one end of the first beverage conduit 401 comprising the adapter body 300.

In this example, the first beverage conduit 401 comprises at or near the second end, a spiraling section 404, where the first beverage conduit 401 defines a spiraling beverage line section. The spiraling section 404 poses a barrier for microorganisms to migrate from the coupler device 200 into the beverage chamber 102. To obtain a particular compact setup, the first beverage conduit 401 comprises a connecting body 404 in which the first beverage flow path spirals in the spiraling section 404 within a plane around an axis, wherein the first beverage conduit 401 ends with a male coupling organ 403 of the connecting body that extends substantially from the spiral plane along the axis. The male coupling member 403 is configured to snappingly mate with a female coupling organ of the coupler device 200. For accommodating the spiraling section 404 of the first beverage conduit 201, the coupler device 200 comprises a seat complementary to the spiraling section 404. A securing body 205 may be provided for securing the coupling between the first beverage conduit 401 and the coupler device 200. The securing body 205 comprises a cover or door 206 that is hingedly connected to a remainder of the coupler housing 201, and movable between an open state in which the cover 206 uncovers the spiral seat for allowing coupling of the first beverage conduit 401 with the coupler housing 201, and a closed state in which the cover 206 latches to the coupler housing 201 to secure said coupling of the first beverage conduit 401 with the coupler housing 201.

The securing body 205 is part of a securing mechanism that comprises a detector mechanism 406 for detecting the presence of a connection between the coupler device 200 and the first end of the first beverage conduit 401. The detector mechanism 406 is configured to cooperate with the securing mechanism in such a way that the detector mechanism enables the securing mechanism to be brought in the secured state, i.e. closure of the cover 206 against the coupler housing, in case the detector mechanism detects the presence of said connection, and to cooperate with the securing mechanism in such a way that the detector mechanism precludes the securing mechanism to be brought in the secured state in case the detector mechanism detects an absence of said connection. Accordingly, the cover 206 cannot be brought in the closed state, latching to the coupler housing, when there is no first beverage conduit 401 connected to the coupler device 200.

Figure 3:
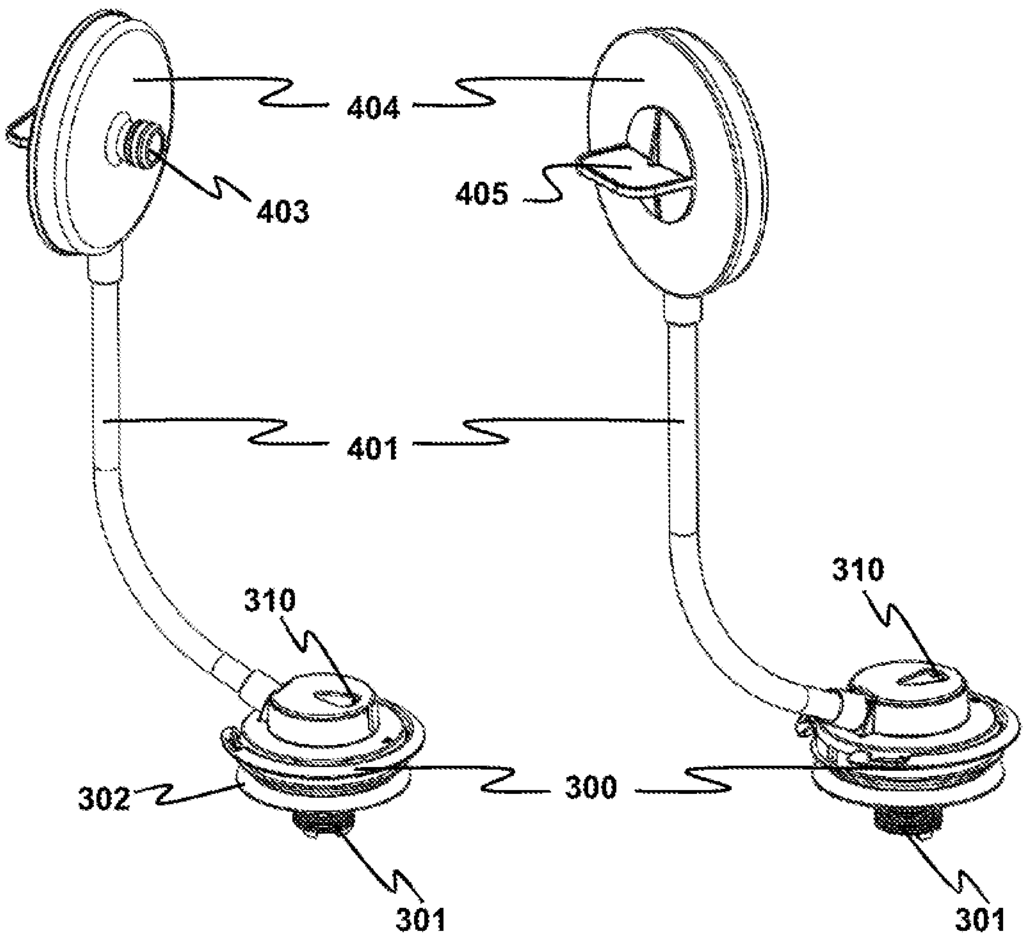
FIG. 3 shows two respective perspective views of a first beverage conduit of the beverage dispensing assembly.
Figure 13:
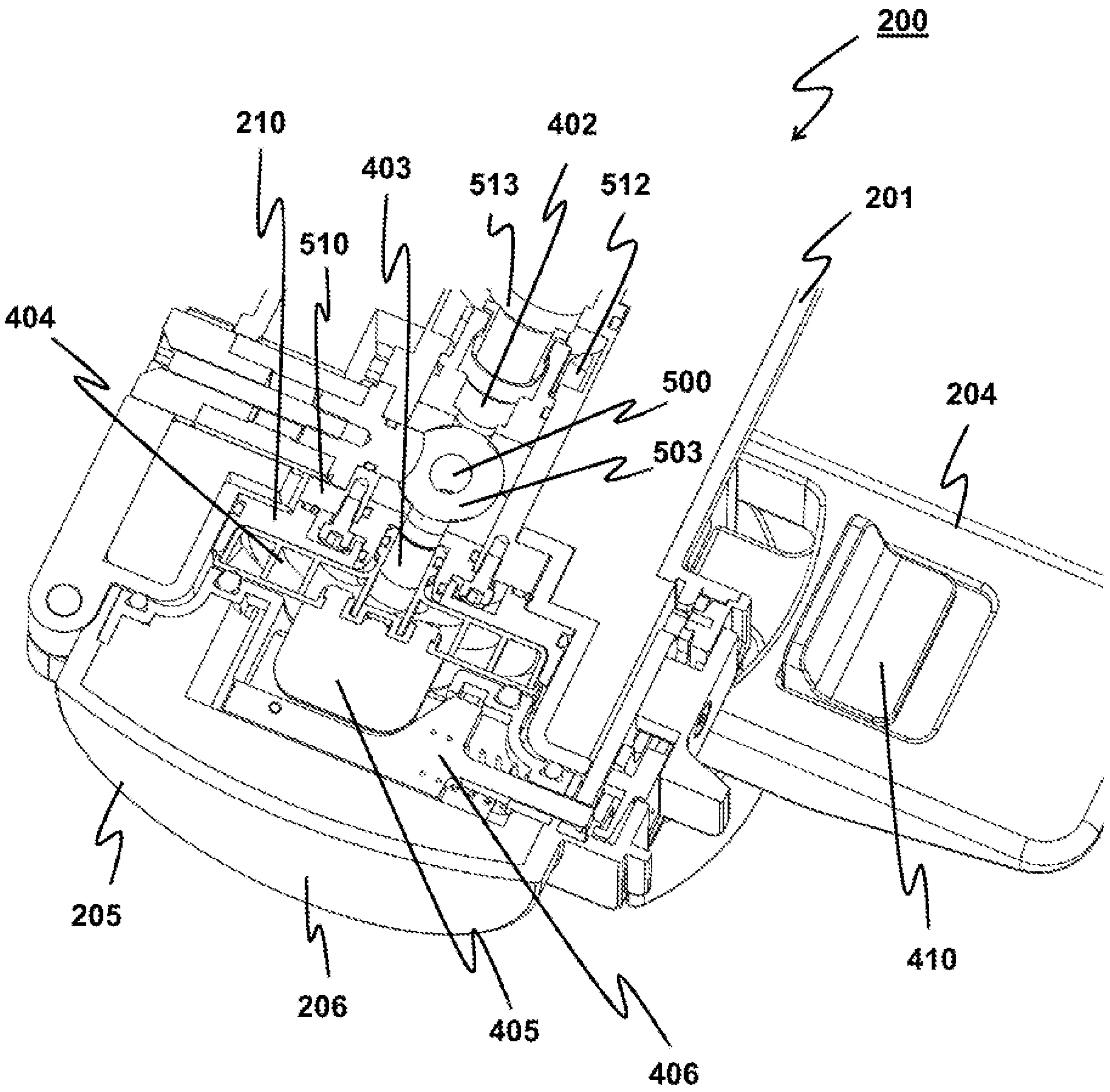
FIG. 13 shows a cross-sectional view of a part of the coupler device of the beverage dispensing assembly.

The connecting body of the first beverage conduit 401 further comprises a detection member 405 arranged to be detected by the detector mechanism 406 when the first end of the first beverage conduit is connected to the coupler device to bring the securing mechanism in the secured state. As best shown in FIG. 3 and FIG. 13 the detection member is formed by a wing-like body 405 extending from a side of the connecting body 404 opposite the male coupling member 403. When the first beverage conduit 401 is connected to the coupler device 200 the wing-like body 405 is positioned such that a spring-biased movable latch 406 of the detector mechanism is moved upon closure of the cover 206. The movable latch 406 to this end has an inclined surface against which the wing-like body 405 acts to move the latch from the unsecured state into the secured state.

A valve, here a ball valve 500, is provided in the coupler device between the first beverage conduit 401 and the second beverage conduit 402, which ball valve 500 is movable between an open position in which the ball valve 500 opens the beverage line 400 to allow a beverage passage, and a closed position in which the ball valve 500 closes the beverage line 400. The ball valve 500 is manually operable by a user by means of a ball valve lever 501, which is pivotally connected to the coupler housing 201. The ball valve 500 includes a ball valve body 502 having a ball valve channel 503 extending therethrough. The ball valve body 502 is rotatable within housing 505, between the open position in which the ball valve channel 503 aligns with the second beverage conduit 402, allowing a passage for the beverage, and the closed position in which the ball valve body 501 is rotated about 90 degrees with respect to the open position, such that the valve body 501 occludes the second beverage conduit 402. It will be appreciated that other type of valves can be used as well.

The coupler device 200 comprises a cooling body, particularly a cooling plate 210. The cooling plate 210 is here substantially annular shaped, wherein a central opening of the cooling plate 210 is configured for receiving the male coupling organ of the first beverage conduit 401 therethrough. The cooling plate 210 contacts the first beverage conduit 401, when the first beverage conduit 401 is coupled to the coupler device 200. More particular, in the coupled state, spiral plane of the spiraling section of the first beverage conduit, extends parallel to a plane in which the cooling plate 210 extends, such that a large contact surface is obtained between the cooling plate and the first beverage conduit 401. Hence, the first beverage conduit 401 is cooled, for cooling the beverage therein. Cooling of the beverage in first beverage conduit's spiraling section 404 poses a barrier for micro-organism to migrate from the coupler device 200, towards the beverage chamber 102, preventing contamination of the beverage. Moreover, for obtaining a refreshing beverage, the cooling plate 210 cools the beverage while the beverage is conducted through the first beverage conduit 401, which obviates the need to cool the entire beverage container.

A coolant conduit circuit is provided for circulating a coolant fluid from a cooled fluid source along the cooling plate 210 for cooling the cooling plate 210. The coolant circuit includes a coolant chamber 510 inside the coupler housing 201 adjacent the cooling plate 210, which coolant chamber 510 is in fluid communication with a coolant inflow channel 511 of the coolant circuit for supplying the coolant to the coolant chamber 510. A coolant drain channel 512 of the coolant circuit is arranged for draining the coolant from the coolant chamber 510. The coolant drain channel 512 is in fluid communication with a coolant return conduit 513 of the coolant circuit that is coupled with one end to the coupler device 200 and with another end to the cooled fluid source. The coolant return conduit 513 at least partly extends coaxially with the second beverage conduit 402 for cooling a beverage flow through the second beverage conduit 402.

To ensure a safe connection of the beverage container 100 with the dispensing line 400, the coupler device 200 is provided with one or more blocking mechanisms. For example, it is preferred to broach the beverage container sealing member 104, only after the first beverage conduit 401 has been connected to the second beverage conduit 402. The one or more blocking mechanisms thus impose a predetermined order of actions to a user prior to fluidly connecting the beverage container 100. In particular, the blocking mechanisms impose the user to: firstly couple the coupling member 403 of the first beverage conduit 401 to the coupler housing 201, secondly broach the sealing member 104 of the beverage container 100 by pushing down on the adapter body 300 with the piston 203, and thirdly open the ball valve 500. Similarly, the one or more blocking mechanisms impose a predetermined order of actions to a user prior to disconnecting the beverage container 100, in opposite order as for connecting the beverage container 100. In particular, the blocking mechanisms impose the user to: firstly close the ball valve 500, secondly move the piston 203 upward with the piston lever 204 to the unbroached position, and thirdly disconnecting the coupling member 403 of the first beverage conduit 401 from the coupler housing 201.

Figure 4:
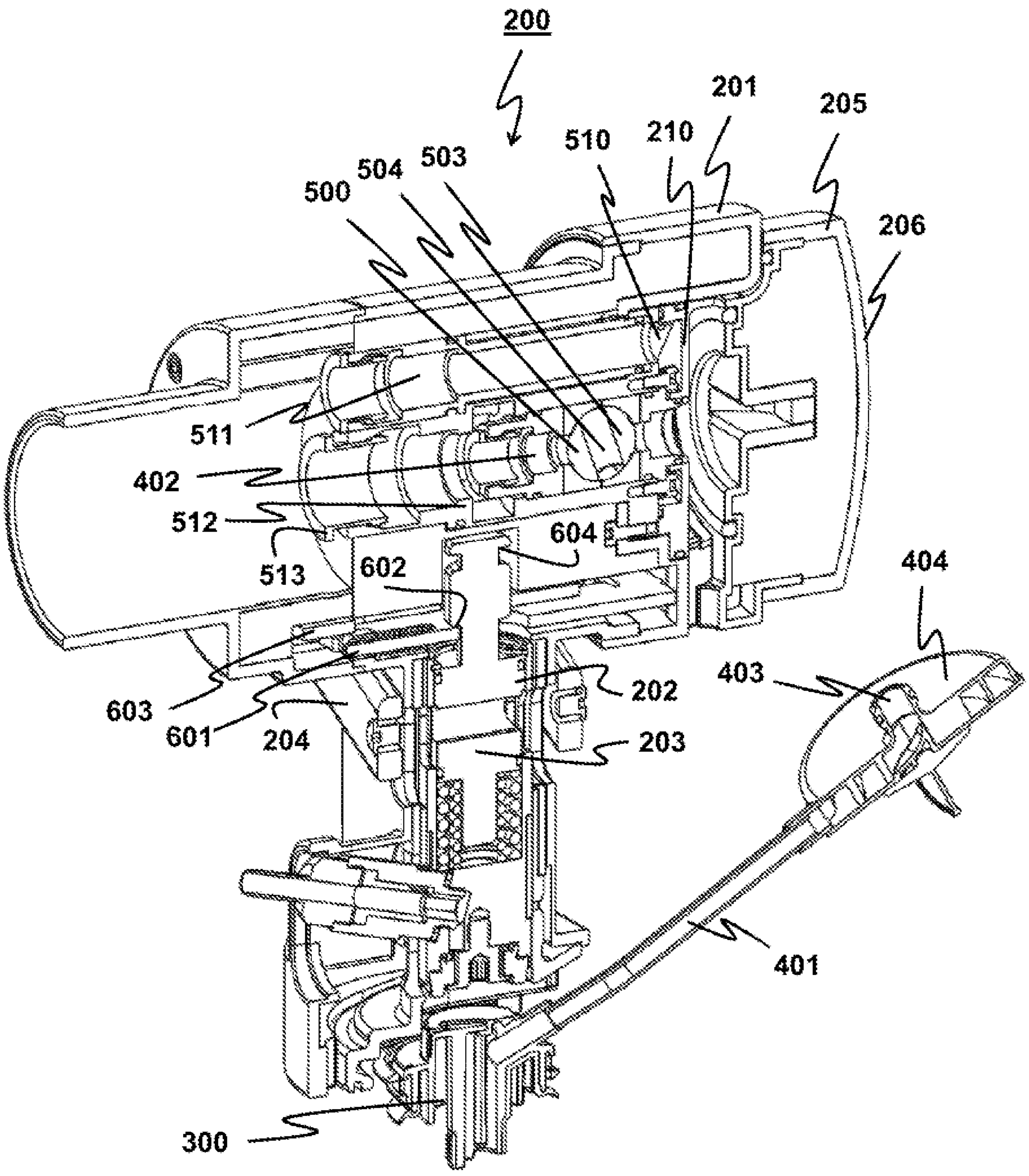
Figure 5:
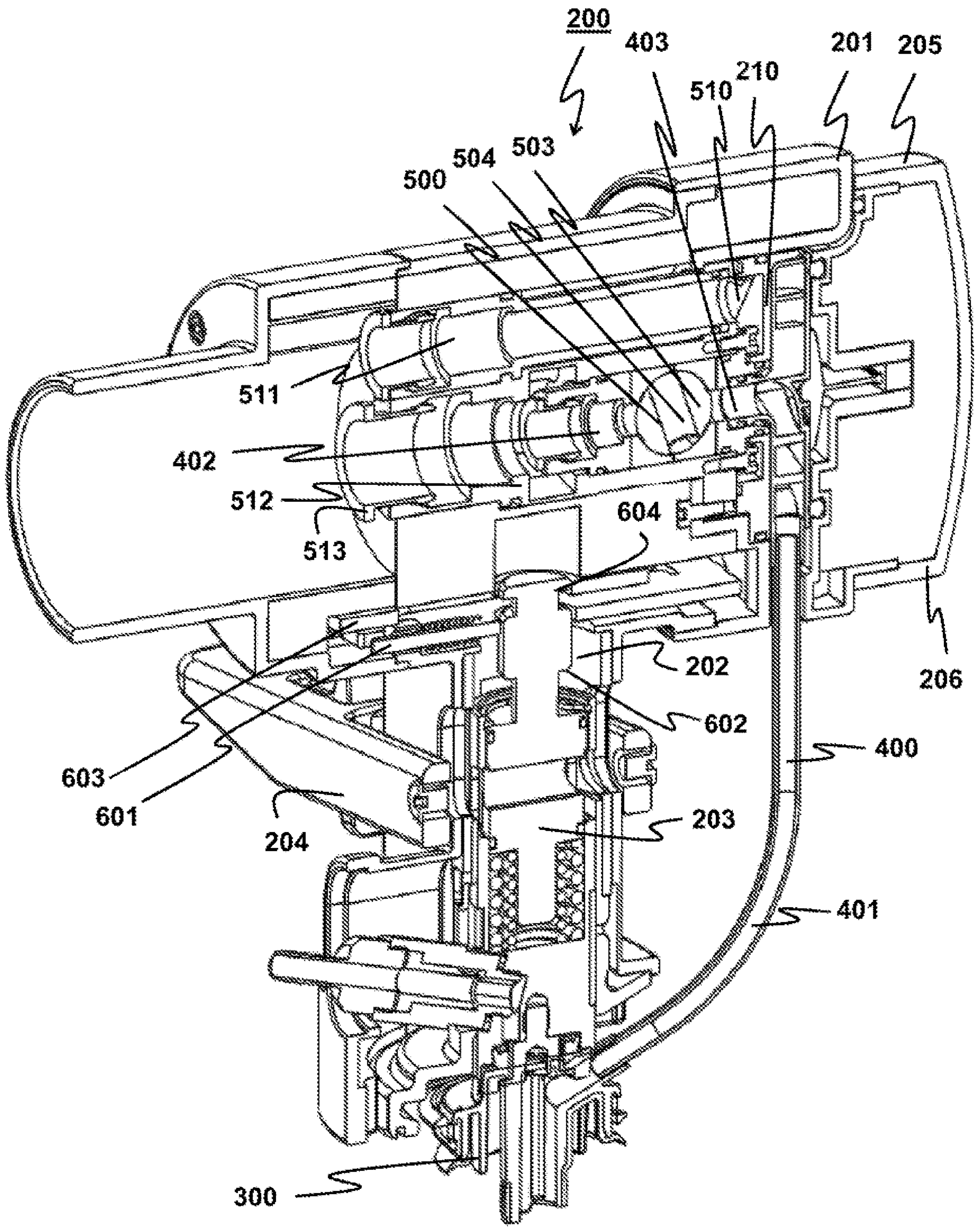
Figure 6:
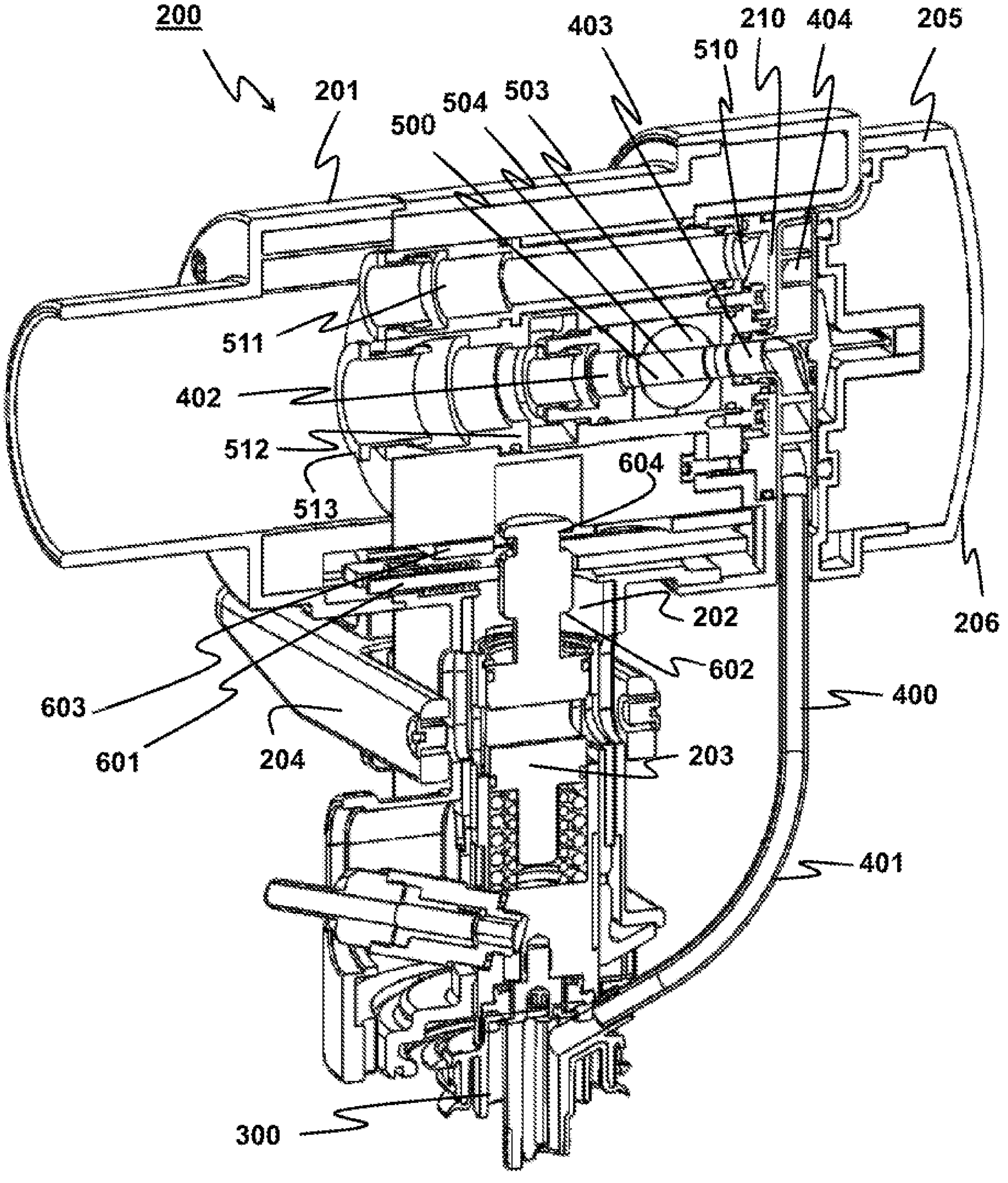
Figure 10:
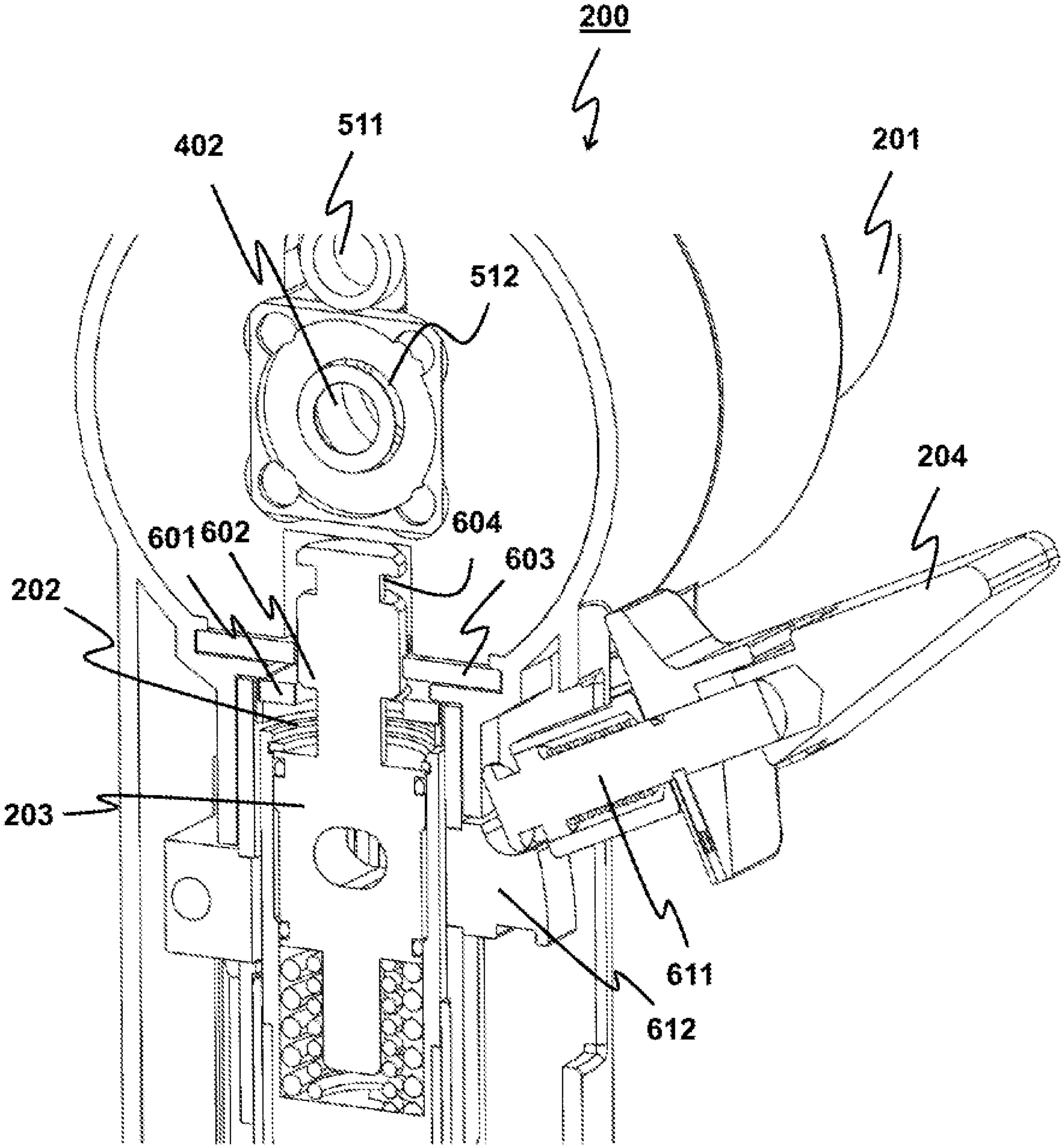
FIGS. 10, 11 and 12 show a cross-sectional view of respective states of the coupler device.
Figure 11:
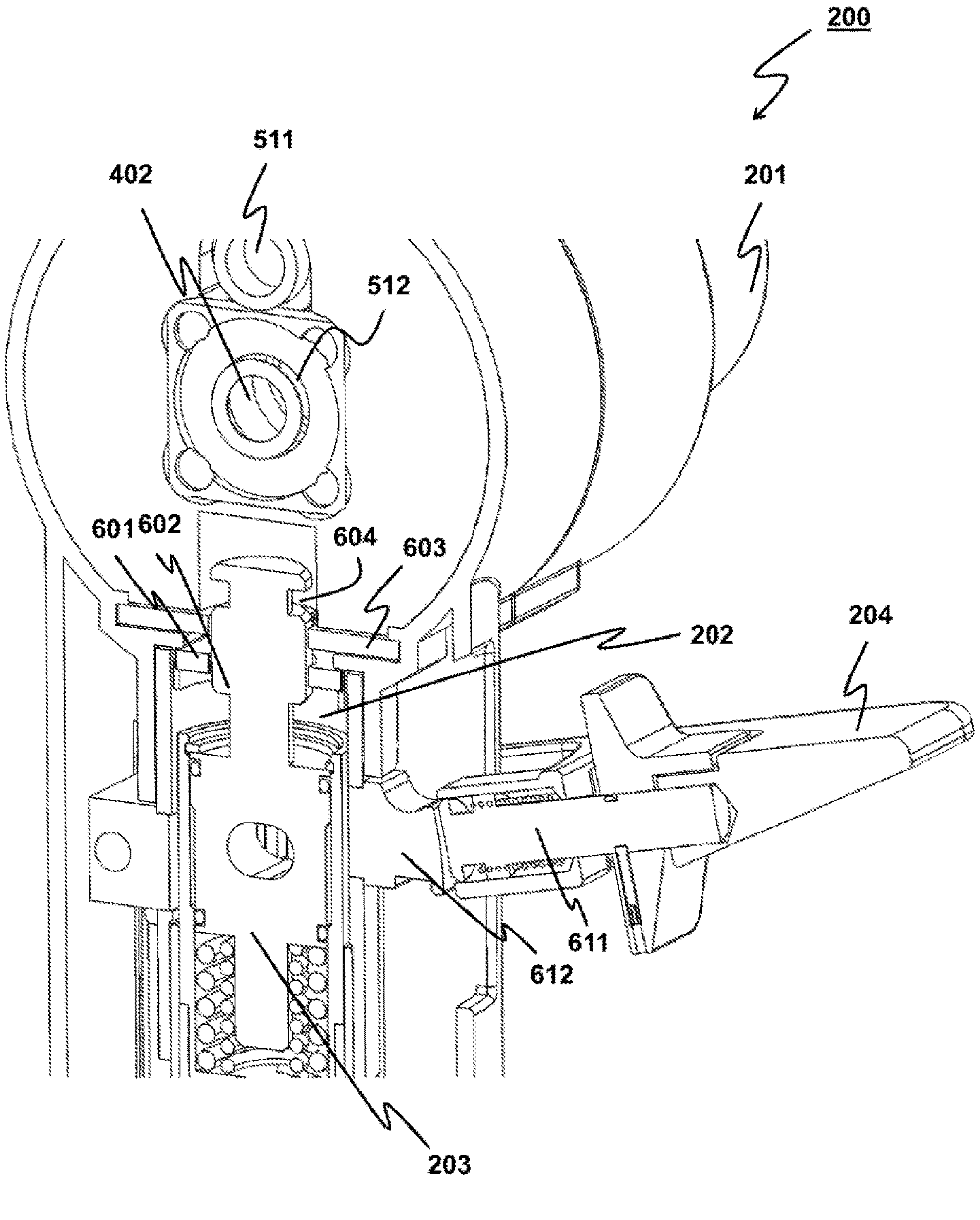
Figure 12:
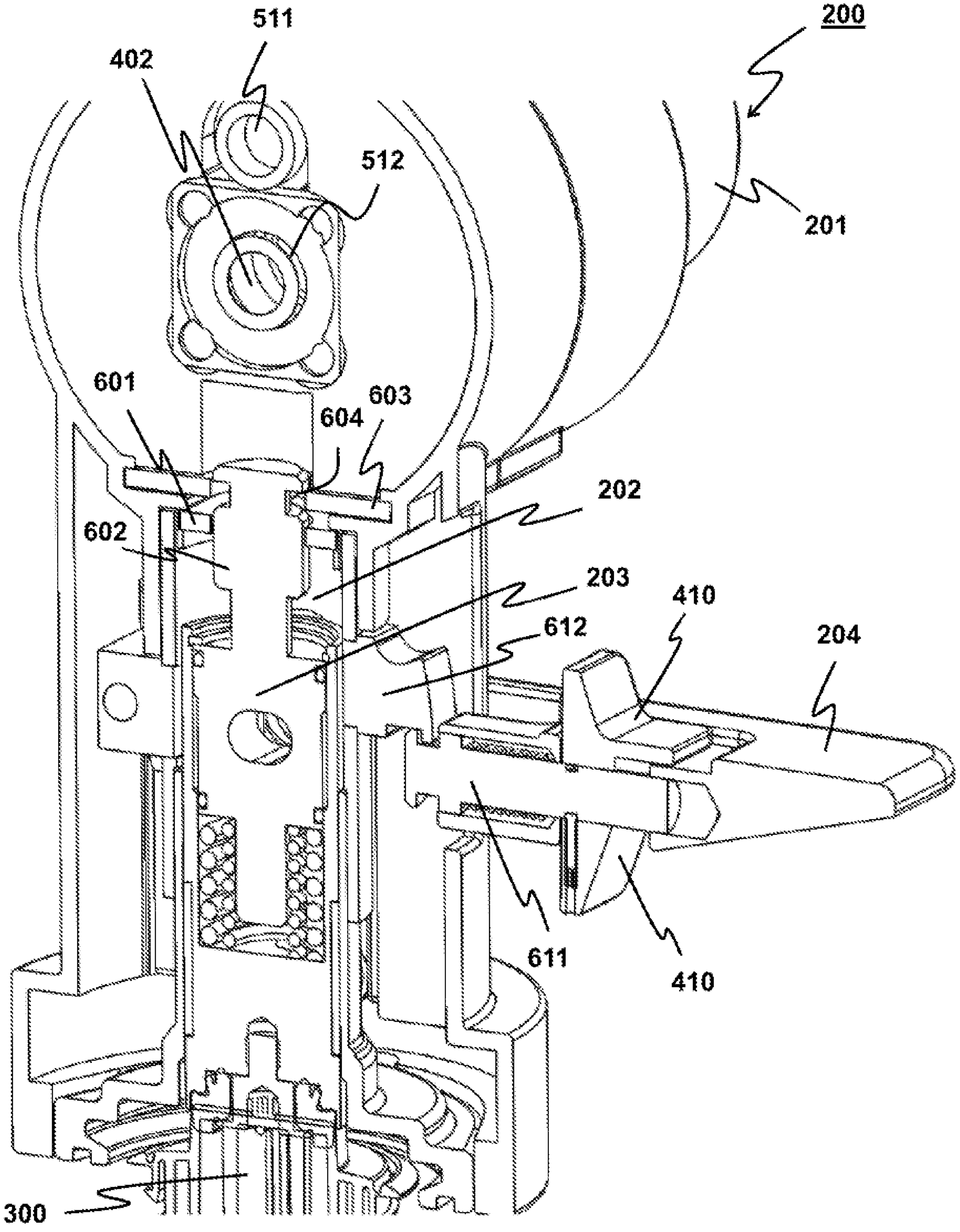

A first blocking mechanism is arranged for blocking the actuation of the piston 203 from an unbroached position to a broached position, in case the coupling member 403 of the first beverage conduit 401 is uncoupled from the coupler device 200. As best seen in FIGS. 4, the piston 203 is in the unbroached position, here in an upward most position relative to the adapter body 300, and the first beverage conduit 401 is disconnected from the coupler device 200. A first key hole plate 601 cooperates with a first shoulder 602 of the piston, thereby blocking an axial motion of the piston 203 in a downward direction towards the adapter body 300. The first key hole plate comprises a plate body with key hole shaped opening therein. Accordingly, the first key hole plate 601 prevents the broaching of the sealing member 104, in case the first beverage conduit 401 is disconnected from the coupler device 200. As best seen in FIG. 5, now the first beverage conduit 401 has been coupled to the coupler device 200. Said coupling affected a translation of the first key hole plate 601 thereby releasing the piston 203, so as to allow for an axial movement of the piston 203 downward towards the adapter body 300. In FIG. 5, the piston 203 is in the broached position, here in an downward most position relative to the adapter body 300. The piston 203 is movable by actuation of the broach lever 204. As best seen in FIGS. 10-12, the broach lever 204 comprises a lever locking mechanism that includes a movable first lever locking member 611 associated with the broach lever 204 and a second lever locking member 612 associated with the coupler housing 201. The broach lever 204 is hingedly connected to the coupler housing 201, and actuates the piston 203 to move between the broached and unbroached positions. The lever 204 can be moved by axially retracting the first lever locking member 611 by means of manually operable broach lever latch 410 to such an extent that the first locking member 611 clears the second locking lever 612. The first locking member 611 can be extended once the piston 203 has reached the broached position, wherein the first locking member 611 and the second locking member 612 interlock to prevent the broach lever 204 and thus the piston 203 to move back to the unbroached position.

Figure 7:
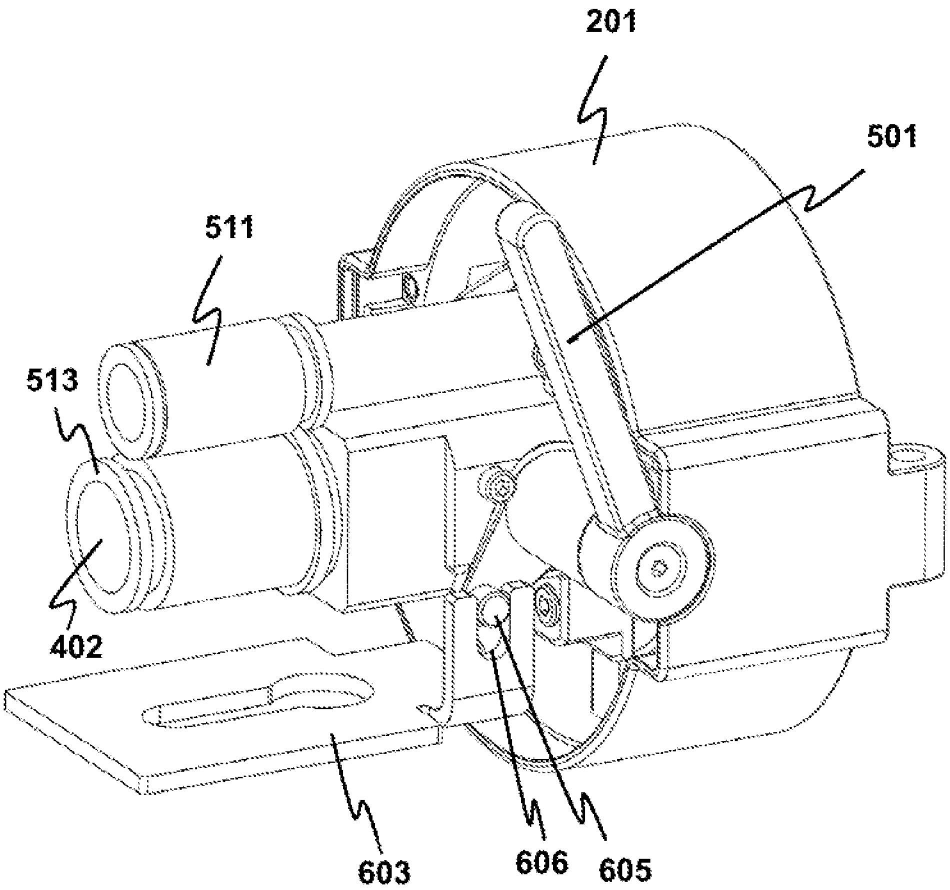
FIGS. 7, 8, and 9 show a detailed perspective view of a part of a coupler device of the beverage dispensing assembly.
Figure 8:
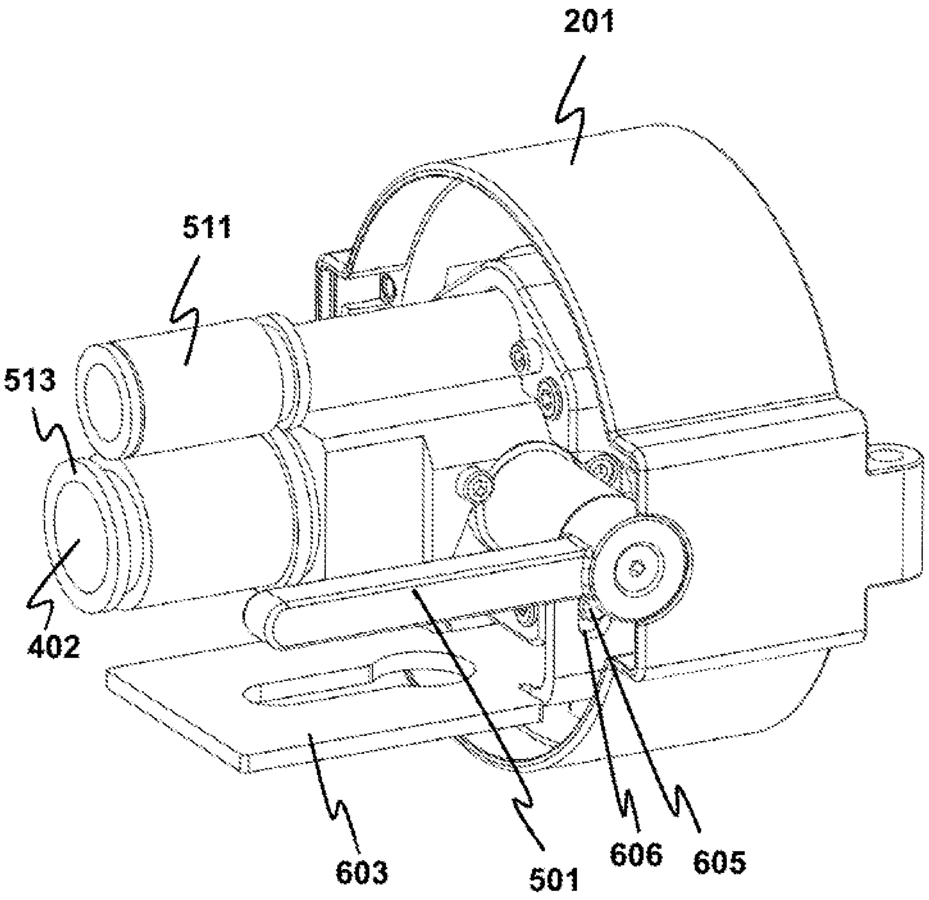
Figure 9:
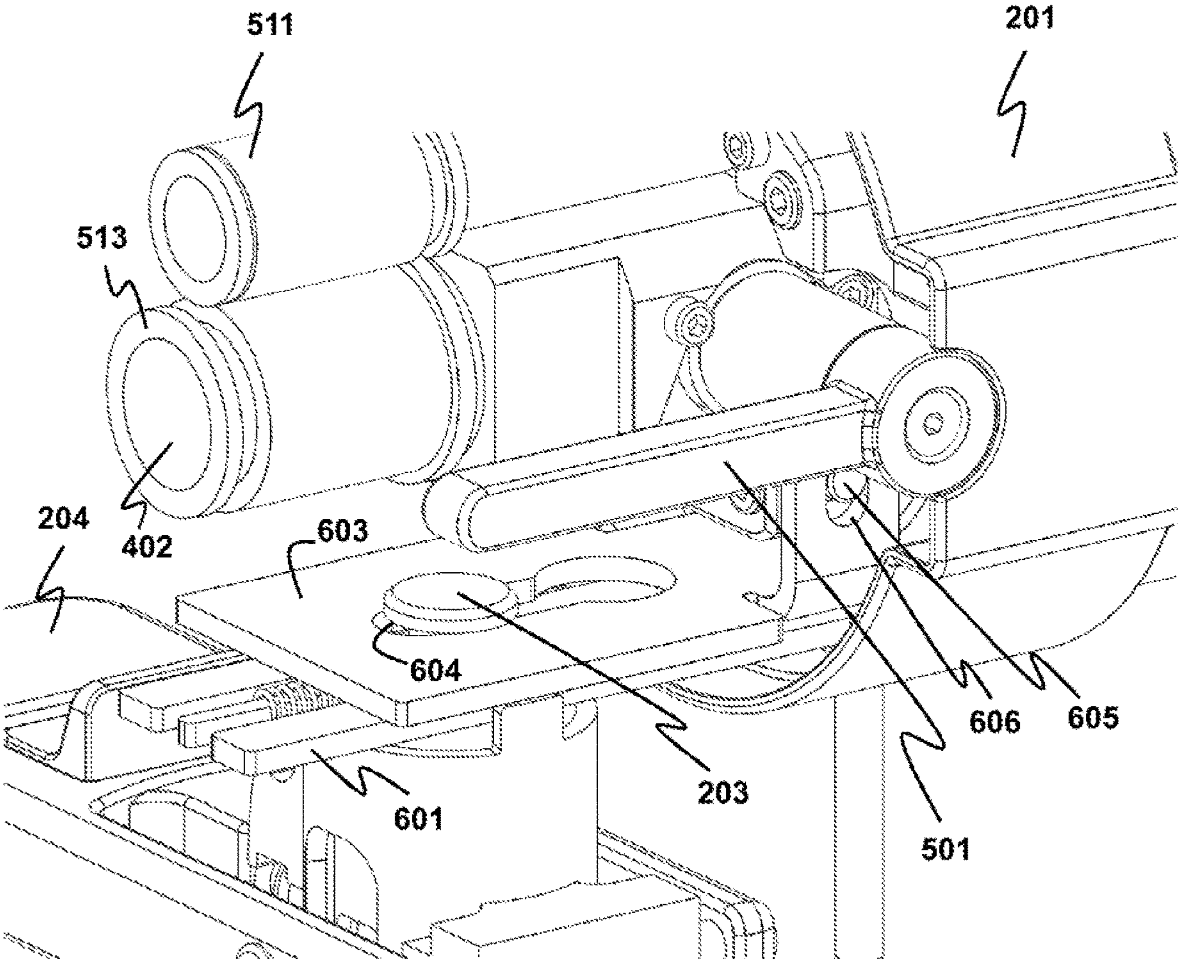

A second blocking mechanism is provided for blocking a motion of the movable broach piston from the broached position to the unbroached position. The second blocking mechanism comprises a second key hole plate 603 arranged for cooperating with a second shoulder 604 of the piston 203. The second blocking mechanism is operable by the ball valve lever 501. As best seen in FIGS. 7-9, the ball valve lever 501 is coupled to the second key hole plate 603, by means of a cam 605 that is associated with the ball valve lever 501 and a slot that is associated with the second 603 key hole plate. By turning the ball valve lever 501, the cam 605 engages the slot 606 and translates the second key hole plate 503 in a plane transverse to the axial direction of the piston 203. As best seen in FIG. 9, the second key hole plate 603 cooperates with the second shoulder 604 of the piston 203, such that the piston 203 is locked in the broached position. In the blocking state of the second blocking mechanism, as shown in FIG. 9, the ball valve 500 is in the open state to allow a flow of beverage through the beverage line 400. Accordingly, the piston 203 can only be moved from the broached position to the unbroached position in case the ball valve 500 is brought into the closed position first. Similarly, due to the key hole shaped opening of the second key hole plate 603, the ball valve 501 can only be opened in case the piston 203 is in the broached position.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

1 Beverage dispensing assembly
100 beverage container
101 container body
102 beverage chamber
103 beverage outlet
104 sealing member
105 neck portion
106 spring
107 container carrying skirt
200 coupler device
201 coupler housing
202 piston space
203 piston
204 broach lever
205 securing body
206 cover
207 gas conduit inlet opening
210 cooling plate
300 adapter body
301 protruding member
302 annular sealing flange
310 gas inlet opening
400 beverage dispensing line
401 first beverage conduit
402 second beverage conduit
403 coupling member
404 spiraling section
405 detection member
406 detection mechanism
410 broach lever latch
500 ball valve
501 ball valve lever
503 ball valve body
504 ball valve channel
510 coolant chamber
511 coolant inflow channel
512 coolant drain channel
513 coolant return conduit
601 first key hole plate
602 first shoulder
603 second key hole plate
604 second shoulder
605 cam
606 slot
611 first lever locking member
612 second lever locking member

The invention claimed is:

1. Beverage dispensing assembly comprising:

a beverage container with a container body defining a beverage chamber for containing a beverage, the container body comprising a beverage outlet provided with a beverage container sealing member arranged to enable opening of the beverage outlet;

a beverage dispensing line extending between the beverage container and a dispenser for dispensing the beverage at a dispensing outlet of the dispenser; and a coupler device comprising a coupler housing arranged for detachable coupling to the container body and for coupling the beverage dispensing line, the coupler housing defining a piston space in which a piston is movably arranged for causing the beverage container sealing member to open the beverage outlet to provide a fluid connection between the beverage chamber and the beverage dispensing line;

wherein the beverage dispensing line comprises a first beverage conduit and a second beverage conduit separate from the first beverage conduit; the first beverage conduit with a first end thereof connected to the beverage container in fluid communication with the beverage outlet and a second end thereof connected to the coupler device to form at least part of a first beverage flow path arranged to guide flow of beverage from the beverage chamber to the coupler device when the beverage outlet is open, the second beverage conduit connected to the coupler device to form a second beverage flow path arranged to guide flow of beverage from the coupler device to the dispenser, and wherein the first beverage conduit at the first end thereof comprises an adapter body through which the first beverage flow path extends, the adapter body being fittingly arranged on the beverage container covering the beverage container sealing member, which adapter body is configured to open the beverage container sea ling member upon movement of the piston of the coupler device acting on the adapter body.

2. Beverage dispensing assembly according to claim 1, wherein the beverage container sealing member comprises a beverage valve movable arranged in the beverage outlet opening between a closed position in which the beverage chamber is closed off and an open position in which the beverage chamber is open for beverage dispensing.

3. Beverage dispensing assembly according to claim 1, wherein the adapter body comprises an annular flange sealingly arranged in the beverage outlet of the beverage container, the adapter body comprising a protruding member extending axially from the annular flange and arranged to displace in an axial direction upon movement of the piston of the coupler device acting on the adapter body to engage the sealing member for opening and closing of the beverage chamber.

4. Beverage dispensing assembly according to claim 3, wherein the adapter body comprises a gas flow channel extending through the annular flange from a gas inlet opening on a first face of the adapter body facing the piston of the coupler device to a gas outlet opening on a second face of the adapter body facing the beverage chamber.

5. Beverage dispensing assembly according to claim 4, wherein the coupler device comprises a gas flow path from a gas conduit inlet opening arranged to couple a gas conduit to the coupler device to a gas outlet opening in fluid communication with the gas inlet opening of the adapter body for supplying gas to the beverage container wherein the gas flow path extends from the inlet opening through the movable piston to the gas outlet.

6. Beverage dispensing assembly according to claim 1, wherein the coupler device comprises inside the coupler housing a cooling body arranged to thermally connect with the first beverage conduit to cool at least part of the first beverage conduit when the first beverage conduit is coupled to the coupler device.

7. Beverage dispensing assembly according to claim 6, wherein the cooling body comprises a cooling plate with a cooling surface adjacent to the at least part of the first beverage conduit.

8. Beverage dispensing assembly according to claim 7, wherein the at least part of the first beverage conduit is provided with a conduit spiral section spiraling in a plane adjacent to the cooling plate cooling surface for cooling at least the conduit spiral section.

9. Beverage dispensing assembly according to claim 6, the assembly further comprising a coolant circuit for circulating a coolant fluid from a coolant fluid source along the cooling body for cooling the cooling body.

10. Beverage dispensing assembly according to claim 9, wherein the coolant circuit includes a coolant chamber inside the coupler housing adjacent the cooling body, which coolant chamber is in fluid communication with a coolant supply channel of the coolant circuit coupled with one end to the coolant fluid source and with an opposite end coupled to the coupler device for supplying the coolant to the coolant chamber and wherein the coupler device contains a coolant drain channel for draining the coolant from the coolant chamber to a coolant return channel of the of the coolant circuit.

11. Beverage dispensing assembly according to claim 10, wherein the coolant return channel is coupled with one end to the coupler device and with an opposite end to the coolant fluid source, and wherein at least one of the coolant supply channel and coolant return channel extends at least partly coaxially with the second beverage conduit for cooling a beverage flow through the second beverage conduit.

12. Beverage dispensing assembly according to claim 1, wherein the coupler device comprises a securing mechanism for securing a connection between the coupler device and the first end of the first beverage conduit.

13. Beverage dispensing assembly according to claim 12, wherein the securing mechanism includes a securing state in which the connection between the coupler device and the first end of the first beverage conduit is secured, and an unsecured state in which the connection between the coupler device and the first end of the first beverage conduit is unsecured, wherein the securing mechanism is operatively coupled to the first blocking mechanism in such a way that the first blocking mechanism is brought into the unblocking state upon bringing the securing mechanism in the secured state, and the first blocking mechanism is brought into the blocking state upon bringing the securing mechanism in the unsecured state.

14. Beverage dispensing assembly according to claim 13, wherein the securing mechanism comprises a detector mechanism for detecting the presence of a connection between the coupler device and the first end of the first beverage conduit, wherein the detector mechanism is configured to cooperate with the securing mechanism in such a way that the detector mechanism enables the securing mechanism to be brought in the secured state in case the detector mechanism detects the presence of said connection, and to cooperate with the securing mechanism in such a way that the detector mechanism precludes the securing mechanism to be brought in the secured state in case the detector mechanism detects an absence of said connection.

15. Beverage dispensing assembly according to claim 14, wherein the first end of the first beverage conduit comprises a connecting body arranged to connect the first beverage conduit to the coupler device, the connecting body comprising a detection member arranged to be detected by the detector mechanism when the first end of the first beverage conduit is connected to the coupler device to bring the securing mechanism in the secured state.

16. Beverage dispensing assembly according to claim 12, wherein the securing mechanism comprises a movable securing body coupled to the coupler housing, the movable securing body in a closed state enclosing a space defined between the movable cover body and the coupler housing and in an open state providing access to the space, wherein the first end of the first beverage conduit is arranged to fit in the space when connected to the coupler device.

17. Beverage dispensing assembly according to claim 1, the coupler device comprising a broach lever coupled to the movable piston for actuating the movable piston to move in the piston space between an unbroached position in which the piston does not act on the adapter body and a broached position in which the piston acts on the adapter body to open the beverage container sealing member, wherein the coupler device comprises a first blocking mechanism arranged for preventing the broach lever from actuating the piston.

18. Beverage dispensing assembly according to claim 1, wherein the coupler device comprises a valve between the first beverage flow path and second beverage flow path, the valve being operable by means of a valve operating device to move the valve between an open position in which the valve opens fluid communication between the first beverage flow path and second beverage flow path, and a closed position in which the valve stops fluid communication between the first beverage flow path and second beverage flow path.

19. Beverage dispensing assembly according to claim 18, the coupler device comprising a second blocking mechanism for blocking the actuation of the movable piston from the broached position to the unbroached position in case the valve is in the open state.

20. Beverage dispensing assembly according to claim 19, wherein the second blocking mechanism is movable between a blocking state in which the second blocking mechanism blocks the actuation of the piston and an unblocking state in which the second blocking mechanism unblocks the actuation of the piston to enable movement of the piston from the broached position to the unbroached position through actuation by the broach lever, the second blocking mechanism being movable from the blocking state to the unblocking state by moving the valve from the open position to the closed position, and the second blocking mechanism being movable from the unblocking state to the blocking state by moving the valve from the closed position to the open position.

21. Beverage dispensing assembly according to claim 19, the coupler device comprising a third blocking mechanism arranged for blocking the operation of the valve from the closed position to the open position, in case the broach piston is in the broached position.

22. Beverage dispensing assembly according to claim 19, wherein the second blocking mechanism comprises a second blocking body arranged for engaging the piston in the blocking state of the second blocking mechanism, to block a movement of the piston from the broached position to the unbroached position, the second blocking body comprising a second shaped through-hole configured to align with a cross sectional shape of part of the movable piston in the unblocking state of the second blocking body to allow said part of the movable piston to extend in the second through-hole and to physically block the movable piston from moving when the second blocking body is in the blocking state.

23. Beverage conduit for use as a first beverage conduit in a beverage dispensing assembly according to claim 1, wherein the beverage conduit defines a first beverage flow path and comprises a first end for coupling to a beverage container and an opposite second end for coupling to a coupler device of the beverage dispensing assembly, wherein the first end comprises an adapter body through which the first beverage flow path extends, the adapter body configured to fit in a beverage outlet of a beverage container of the beverage dispensing assembly to cover a beverage container sealing member, wherein the second end of the beverage conduit comprises a conduit spiral section spiraling in a plane within a conduit connecting body for connecting to the coupler device.

* * * * *